June 27, 1967  J. R. YOUNKIN ET AL  3,328,548
AUTOMATIC TRIM SYSTEM SWITCH MEANS FOR AIRCRAFT
Original Filed April 17, 1964  2 Sheets-Sheet 1
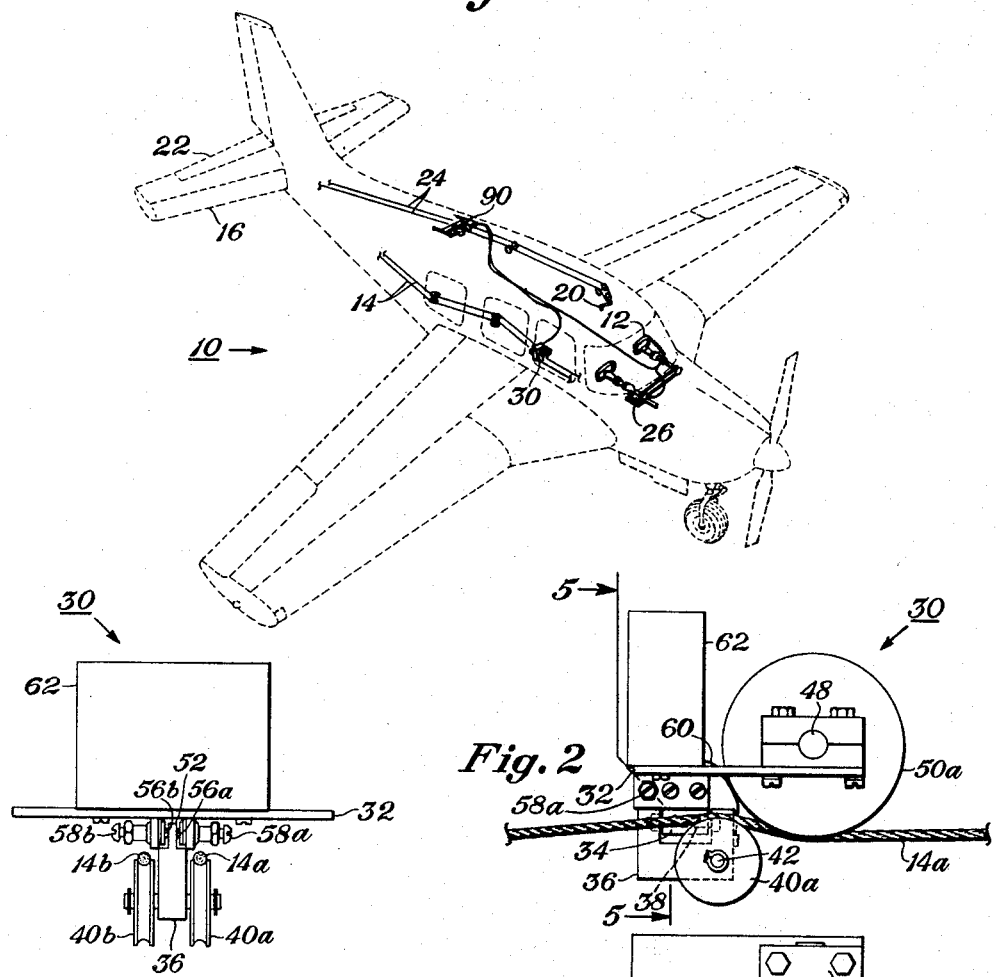
Inventors
James R. Younkin
Don H. Mitchell
Daniel M. Thurman
By Richards, Harris & Hubbard
Attorney

United States Patent Office 3,328,548
Patented June 27, 1967

3,328,548
AUTOMATIC TRIM SYSTEM SWITCH
MEANS FOR AIRCRAFT
James R. Younkin, Don H. Mitchell, and Daniel M. Thurman, all of Mineral Wells, Tex., assignors, by mesne assignments, to Thurman & Younkin, Inc., a corporation of Texas
Original application Apr. 17, 1964, Ser. No. 360,497, now Patent No. 3,268,187, dated Aug. 23, 1966. Divided and this application Aug. 16, 1965, Ser. No. 493,601
5 Claims. (Cl. 200—153)

This application is a division of Ser. No. 360,497, filed Apr. 17, 1964, now Patent 3,268,187, granted Aug. 23, 1966.

The present invention relates to automatic control systems, and more particularly, but not by way of limitation, relates to an automatic pitch trim system for an aircraft or other vehicle having similar control modes.

In normal flight, it is necessary to adjust or trim the controls of an airplane in order to maintain the desired flight attitude without continued manual effort on the part of the pilot, or continued operation of an autopilot. In most aircraft, the pitch control is subject to the greatest movement in order to attain all the necessary flight attitudes. Accordingly, nearly all aircraft are provided with a manually-actuated pitch trim which must be adjusted to large degrees during take-off, climb, approach and landing, and from time to time during normal flight as a result of changes in power settings, changes in the weight of the aircraft due to use of fuel and shift of passengers, or when changing altitude. The manually-operated trim tab systems require a considerable amount of attention, particularly during the approach and landing when the maximum demand is made upon the pilot's attention for other matters.

If the aircraft is not properly trimmed while being controlled by an automatic pilot, the autopilot will be required to continuously exert a corrective force on the control. This, together with changes in the trim requirements during the course of autopilot flight, frequently results in relatively high and occasionally excessive loads on the autopilot. In addition to being deleterious to the autopilot, the improper trim of the aircraft can become a hazard because when the autopilot becomes overburdened, the aircraft becomes unstable, and the pilot's first instinct is to quickly de-activate the autopilot. This sometimes results in an abrupt change in the attitude of the aircraft which can be quite hazardous and at best is undesirable.

The pitch control or elevator of most light aircraft is controlled by a pair of tension cables which extend in generally parallel relationship from the cockpit to the elevators to actuate a bellcrank which is connected to raise and lower the elevators. The manual pitch trim control is usually comprised of a wheel or hand crank which is connected through cables and suitable linkage to a trim tab located on the movable elevator control surface. Operation of the pitch trim control repositions the trim tab in such a manner as to change the aerodynamic effect of the elevator or pitch control element.

The present invention contemplates an automatic trim system by which an aircraft can be trimmed merely by exerting the customary pressure above the control wheel or stick, as the case may be, necessary to effect the desired flight attitude and closing a switch to energize the automatic trim system. The force exerted by the pilot is then sensed and a servo system actuated to move the trim tab in a manner to trim the airplane until no further force is required to maintain the selected flight attitude. Automatic pitch trim systems for accomplishing this purpose have been heretofore available. However, such devices have been relatively complex and by and large have been limited to large and expensive aircraft wherein the automatic trim systems have been incorporated in the aircraft control system at the time of manufacture.

The present invention is concerned with an automatic trim system which is particularly adapted for use in light aircraft of the type which utilize cables for actuating a control surface, and which have manually-actuated trim tabs associated with the control surface to change its aerodynamic effect.

In general, the automatic trim system is comprised of first and second electric switch means; means for comparing and detecting an imbalance between first and second forces applied to the control surface, and for closing the first switch means when the first force exceeds the second force, and for closing the second switch means when the second force exceeds the first force; electric servo means for actuating the trim system in either direction; first circuit means for slowly energizing the servo means in response to closing of the first switch means to actuate the trim system in a manner to reduce the first force and for quickly de-energizing the electric servo means upon opening of the first switch means, and second circuit means for slowly energizing the electric servo means in response to closing of the second switch means to actuate the trim system in a manner to reduce the second force, and for quickly de-energizing the electric servo means upon opening of the second switch means.

In accordance with a more specific aspect of the invention, the means for comparing and detecting an imbalance between the first and second forces is comprised of a member pivotally supported for pivotal movement about an axis for closing the first switch means and opening the second switch means when pivoted in a first direction about the axis and for closing the second switch means and opening the first switch means when pivoted in the second direction about the axis, first means for engaging and deflecting a first control cable such that tension in the cable will tend to pivot the member about the axis in the first direction with a force proportional to the tension in the cable and second means for engaging and deflecting the second control cable such that tension in the cable will tend to pivot the member in the second direction about the axis with a force proportional to the tension in the second cable.

The present invention also contemplates a novel amplifier circuit means for energizing the servo means in response to closing one of the switch means as a result of an imbalance between the forces applied to the control surface comprising a transistor the emitter of which is connected through a relatively small resistor to a power voltage, the collector of which is connected to ground, the base of which is connected through a capacitor to the power voltage and through a relatively large resistor to the respective switch means, and a power circuit connected to the electrical servo system for energizing the servo system responsive to conductance of the transistor.

Therefore, an important object of the present invention is to provide an automatic pitch trim system of the type described which may be installed in most light aircraft without appreciable alteration of the existing control system.

Still another object of the present invention is to provide a system of the type described having increased sensitivity.

Yet another object of the present invention is to provide a system of the type described which is highly reliable.

A still further object of the invention is to provide a system of the type described which may be used in conjunction wtih any conventional type of autopilot so as to continuously maintain the aircraft in proper trim and thereby reduce the load on the autopilot and eliminate violent reactions as a result of de-energization of the autopilot.

Another object of this invention is to provide a highly simplified sensing device for comparing and detecting an imbalance in the forces applied to a control surface of an aircraft or the like.

Still another object of the invention is to provide an improved servo circuit means operative in response to the alternate closing and opening of two switches to drive a servo-motor or the like in such a manner as to alleviate the command situation causing one of the switches to close.

Yet another object of the present invention is to provide a simplified servo system for automatically maintaining a predetermined condition.

Many additional objects and advantages will be evident to those skilled in the art from the following detailed description and drawings, wherein:

FIGURE 1 is a schematic perspective view of a system constructed in accordance with the present invention;

FIGURE 2 is a side view of the force-imbalance sensing device of the system of FIGURE 1;

FIGURE 3 is an end view of the force-imbalance sensing device of FIGURE 2;

FIGURE 4 is a top view of the force-imbalance sensing device of FIGURE 2;

FIGURE 5 is a partial sectional view of the force-imbalance sensing device of FIGURE 2 taken generally on lines 5—5 of FIGURE 2.

Figure 6:
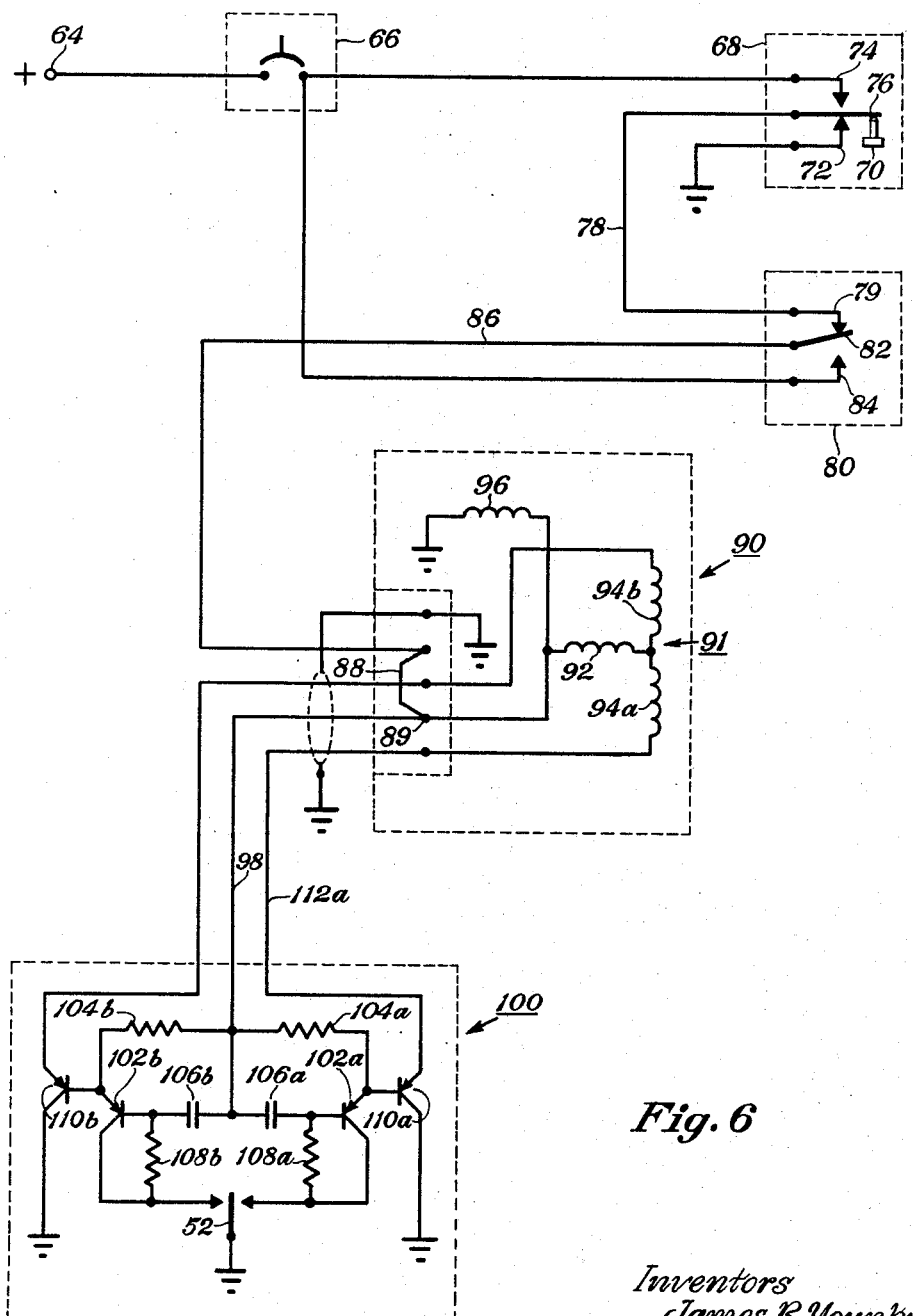
FIGURE 6 is a schematic circuit diagram of the automatic trim system constructed in accordance with the present invention.

Referring now to the drawings, and particularly to FIGURE 1, the pitch of an aircraft 10 is controlled by a manually-operated control wheel 12 which actuates a pitch control surface 16 or elevator through a conventional linkage system including a pair of cables 14. For example, when the control wheel 12 is pushed forward by the pilot, the trailing edge of the control surface 16 will be lowered and the aircraft moved into a relative nose-low attitude. The forces tending to neutralize the control surface 16 result in an imbalance between the tensions in the cables 14, with a greater tension being present in the cable which moves the trailing edge of the control surface downwardly. Conversely, when the back pressure is exerted on the control wheel 12, the trailing edge of the control surface is moved upwardly to cause the nose of the aircraft to rise and the tension in the other of the cables becomes greater.

In order to maintain the aircraft in either a nose-low or nose-high attitude, it is necessary to continually exert pressure on the control wheel or the aircraft will tend to return to the flight attitude for which it is trimmed. However, the aircraft can be trimmed to any set attitude by a hand crank 20, for example, which actuates a trim tab surface 22 through cables 24 to change the aerodynamic effect of the control surface 16 and thereby change the stabilized flight attitude of the aircraft.

An automatic pilot 26 may be used to maintain a pre-selected flight attitude wtih regard to the pitch axis, or a pre-selected altitude. The autopilot 26 is coupled to the control system altitude. The autopilot 26 is coupled to the control system and also actuates the control surface 16 through the cables 14. When using the autopilot, it heretofore has been necessary to first manually trim the aircraft using the hand crank 20 to the desired flight attitude. Then the autopilot 26 controls the pitch of the aircraft through the manual control cables 14 in much the same manner as the pilot and produces tensions in the cables 14 whenever pressures are applied to the control system to maintain the pre-selected flight attitude.

The present invention is comprised of a system for detecting an imbalance between the tensions in the cables 14 and for automatically adjusting the trim of the aircraft through the trim tab control cables 24 so as to eliminate the imbalance. This alleviates the necessity of manually trimming the aircraft with the hand crank 20 when the aircraft attitude is controlled either manually or by the autopilot 26, as will hereafter be described in greater detail.

The imbalance in tension of the cables 14 is detected by a sensing device indicated generally by the reference numeral 30 and illustrated in FIGURES 2–5. The sensor 30 is comprised of a support 32 which may be secured to the air frame of the aircraft 10 by any suitable means (not shown). A journal block 34 is connected to the underside of the support plate 32 and a member 36 is pivotally connected to the journal block by a suitable pivot pin 38 such that the member 36 will pivot about about an axis extending generally along the axis of the pin. An axle 42 is connected to the member 36 generally at right angles to the pivotal axis formed by the pin 38. A pair of pulleys 40a and 40b are journaled on the axle 42 at opposite sides of and equidistant from the pivot pin 38. The pulley 40a engages and deflects the cable 14a, and the pulley 40b engages and deflects the cable 14b. Pillow blocks 46a and 46b are connected to finger portions 44a and 44b, respectively, of the support plate 32. The ends of an axle 48 are secured in the pillow blocks 46a and 46b and the axle 48 extends generally parallel to the axle 42. A second pair of larger pulleys 50a and 50b are journaled on the axle 48 and engage and deflect the cables 14a and 14b, respectively, in directions opposite to the directions in which the respective cables are deflected by the respective pulleys 40a and 40b. The pulleys 50a and 50b serve to amplify the effect of the tension in the cables 14a and 14b on the pulleys 40a and 40b as will presently be described. The relatively thin finger portions 44a and 44b serve as a rather stiff spring means to provide some degree of resiliency to the force applied to counterdeflect the cables 14a and 14b. From the description of the pulley arrangements, it will be evident that the tension in the cables 14a and 14b tend to pivot the member 36 in opposite directions about the axis formed by the pivot pin 38. When the tensions in the cables are equal, the member will be centered. However, any difference between the tensions will cause pivotal movement of the member 36 about the pin 38.

A pair of switch means which are alternately closed and opened as a result of pivotal movement of the member 36 can best be seen in FIGURE 5. The left-hand end of the member 36, when referring to FIGURE 2, is provided with a portion that extends above the pivot pin 38 and forms a switch blade 52. A pair of insulating plates 54a and 54b are connected to the journal block 34 and extend to points on opposite sides of the switch blade portion 52. A pair of electrical contacts 56a and 56b are positioned between the insulated plates 54a and 54b for alternate engagement with the switch blade portion 52 as the member 36 is pivoted about the pin 38. The relative positions of the contacts 56a and 56b may be adjusted by screws 58a and 58b to adjust the device and increase its sensitivity. Thus if the tension in the cable 14a exceeds the tension in the cable 14b, the member 36 will be pivoted a first or clockwise direction when referring to FIGURE 3 such that the switch blade portion 52 will close against the contact 56a, and contact 56b will be opened. Conversely, if the tension in cable 14b exceeds the tensions in cable 14a, the member 36 will be pivoted in the counterclockwise or second direction when referring to FIGURE 3 such that the switch blade 52 will close against the contact 56b, and the contact 56a will be open. The member 36, and therefore the switch blade 52, may be connected to ground by a cable 60. The contacts 56a and 56b may be connected to control circuits by any suitable leads (not illustrated). The control circuits may conveniently be located in the housing 62, and will now be described.

Referring to the circuit diagram of FIGURE 6, a positive voltage terminal 64 is connected by a circuit breaker 66 to a manually-actuated switch 68. The switch 68 is preferably comprised of a manually-operated button 70 positioned on the control wheel of the aircraft so that the pilot can close the switch without removing his hand from the control wheel. The switch 68 has a first contact 72 which is connected to ground and a second contact 74 which is connected to the circuit breaker 66. The switch blade 76 is spring-biased into engagement with the contact 72 and is manually closed against the contact 74 by pressing the button 70. The switch blade 76 is connected by lead 78 to the contact 79 of a second switch 80. The switch 80 has a switch blade 82 which is spring-biased against the contact 79 and is moved by a cam against a contact 84 whenever the automatic pilot is actuated to exert a force on the pitch control surface 16. The switch blade 82 is connected by lead 86 and jumper lead 88 to terminal 89 of a trim tab servo system indicated generally by the reference numeral 90.

The trim tab servo system 90 has a reversible motor 91 having an armature winding 92 and split field windings 94a and 94b. The armature winding 92 is connected to terminal 89. The solenoid 96 of a magnetic clutch (not illustrated) is also connected to the positive terminal 89 and to ground. The trim tab servo system 90 is coupled through the magnetic clutch to drive the trim tab cables 24 in alternate directions so as to trim the aircraft as will hereafter be described. The positive terminal 89 is connected through lead 98 to a dual amplifier circuit means indicated generally by the reference numeral 100. Each of the amplifier circuits is identical and, for simplicity, corresponding components are therefore designated by the same reference numerals followed by the subscripts "a" or "b" as will hereafter be evident.

The emitter of a transistor 102a is connected through a relatively small resistor 104a to the lead 98 which provides a source of positive voltage. The collector of the transistor 102a is connected to the contact 56a of the sensing device 30. The base of the transistor 102a is connected by a capacitor 106a to the positive voltage lead 98 and through a relatively large resistor 108a to the contact 56a of the sensing device 30. The switch blade portion 52 of the sensing element is connected to ground. The emitter of the transistor 102a is also connected to the base of a transistor 110a. The emitter of the transistor 110a is connected by lead 112a to the field winding 94a of the motor 91 and the collector is connected to ground. The resistor 104a may be on the order of 470 ohms while the resistor 108a may be on the order of 3.3 kilo ohms. The other half of the circuit is of identical construction but is connected to the contact 56b of the sensing device 30 and to the field winding 94b of the motor 91.

*Operation*

Assume now that the automatic pitch trim system is to be manually operated in response to manual actuation of the control wheel. The automatic pilot would be deactivated and the switch blade 82 of the switch 80 would be closed against the upper contact 79. The manually-operated control wheel switch 68 would be spring-biased against the contact 72. The high voltage terminal 89 is then connected to ground through leads 88 and 86, contact 79, switch blade 82, lead 78, switch blade 76 and contact 72 so that the motor 91 is shorted to ground and cannot possibly be operated. Assume for purposes of illustration that the aircraft has just taken off and it is desired to trim the aircraft in a climb attitude. The pilot would then exert back pressure on the control wheel and press the button 70. The switch blade 76 would be closed against the contact 74 and the positive terminal 89 energized through the contact 79 of the switch 80. At the same time, assuming that the cable 14a actuates the control surface in such a manner as to cause the aircraft to assume a climbing attitude, the switch blade portion 52 would be closed against the contact 56a as a result of the imbalance between the tension in the cable 14a and the cable 14b which would pivot the member 36 in the clockwise direction, when referring to FIGURE 3, about the pivot pin 38.

When both the manually-operated switch blade 76 is closed against the contact 74 and the switch blade portion 52 is closed against the contact 56a, the base of the transistor 102a will be connected to ground through the resistor 108a so as to slowly charge the capacitor 106a. Since the resistor 108a is quite large, a significant time delay will occur before the voltage at the base of the transistor 102a is reduced sufficiently with respect to ground to begin to turn the transistor "on." As the impedance of the transistor 102a is reduced, the base of the power transistor 110a becomes more negative and the impedance of the power transistor 110a is reduced substantially linearly. Current then passes through the armature winding 92 of the series-wound motor 91 and through the field winding 94a to drive the motor. As the switch blade 76 is closed against the contact 74, the magnetic clutch solenoid 96 is also energized to couple the trim tab servo system 90 to the trim tab cables 24. The motor 91 then drives the trim cables 24 in the direction required to trim the aircraft in the desired climbing attitude. Actuation of the trim tab cables continues until such time as the tension in the elevator control cables 14 is again equalized due to the adjusted trim of the aircraft. Then the switch blade portion 52 opens from the contact 56a. When the contact 56a opens, the capacitor 106a very quickly discharges, through the loop comprised of the relatively small resistor 104a and the emitter and base of the transistor 102a which then merely functions as a diode because the operating potential has been removed from the collector. The rapid discharge of the capacitor 106a results in a rapid rise in the impedance of the transistor 102a and consequently in the transistor 110a to very quickly de-activate the servomotor 91 and accurately stop the trim tab control surface at the desired position.

Operation of the automatic trim system 10 to automatically trim the airplane in the nose-down or descending attitude is accomplished in precisely the same manner except that the tension in the cable 14b overbalances the tension in the cable 14a so as to pivot the member 36 and close the switch blade portion 52 against the contact 56b. The transistor 102b is then relatively slowly turned "on" as the capacitor 106b is charged to slowly turn the power transistor 110a "on." Current then passes through the armature winding 92 and field winding 94b to drive the servomotor 91 in the opposite direction to that previously described and move the trim tab control surface in such a manner as to equalize the tensions in the control cables 14a and 14b.

When the automatic pitch trim system is operated in conjunction with an autopilot, the switch blade 76 of the pilot's control switch 68 is spring-biased against the ground contact 72. Then when the autopilot is activated, but not engaged, the switch blade 82 of the switch 80 will be closed against the contact 79 as a safety measure to insure against accidental operation of the servomotor 91. However, when the automatic pilot exerts a force on the control system, a cam moves the switch blade 82 against the contact 84 so as to energize servo system 90 and circuit means 100. The automatic pitch trim system 10 will then function in the manner previously described any time that the autopilot causes the tension of one of the cables 14a or 14b to exceed the tension in the other in order to maintain the preselected flight attitude or altitude.

It is important to note that in order to have a highly sensitive and accurate system, the device 30 must compare the tension in the cable 14a with the tension in the cable 14b and detect any minute difference. This can be accomplished only if the contacts 56a and 56b are adjusted extremely close to the switch blade portion 52 so as to reduce the travel required of the switch blade portion before it closes against the contacts to a minimum. Thus it will be appreciated that when the tension in the two cables is substantially equal, a certain amount of rapid opening and closing of the contacts, or "chattering," will result. This condition is particularly acute in turbulent air. Therefore, it is important that some means be provided to prevent false actuation of the system. This is accomplished by a very rapid response time when going from the "on" state to the "off" state as compared to going from the "off" state to the "on" state. More specifically, the circuit means 100 has a much more rapid decay time-constant than build-up time-constant. The relatively large resistor 108b controls the rate at which the capacitor 106a is charged and the capacitor must be charged to turn the transistor 106a "on." The relatively small resistor 104a controls the rate at which the capacitor 106a discharges each time that the contact 56a is opened. Thus if the contact 56a is closed a number of times in quick succession, the capacitor 106a cannot be charged to a sufficient extent to turn the transistor 102a "on" because each time the contact 56a opens, the charge on the capacitor 106a is quickly dissipated through the emitter base of the transistor 102a which functions as a diode when the collector circuit is opened. Therefore unless the contact 56a is closed for a sufficient period of time for the capacitor 106a to be charged through the relatively large resistor 108a, the system will not be activated.

It will be appreciated that without this rapid discharge or reset feature, it would be possible to charge both capacitors 106a and 106b to such an extent as to turn both transistors 110a and 110b "on" if the switch blade portion 52 were to "chatter" between the contacts 56a and 56b. This would energize both field windings 94a and 94b at the same time and probably damage the motor 91. It will also be appreciated that the circuit illustrated in FIGURE 6 is highly stable in operation. For example, when the contact 56a is open, the emitter and base of the transistor 102 are at essentially the same voltage so that the transistor is biased "off." Similarly, the emitter and base of the transistor 110a are at substantially the same voltage so that the transistor is "off." Conversely, when the contact 56a is closed, the base of the transistor 102a is connected through the resistor 108a to ground so that the impedance of the transistor 102a is reduced to a low value, and the base of the transistor 110a is then reduced to a low voltage level to insure a positive switching action.

From the above detailed description of a preferred embodiment of the invention, it will be evident that a simple and economical automatic trim system which can be used in combination with the standard control system of most light aircraft has been described. The system is reliable and safe and is highly sensitive. A novel means for comparing the tension in two generally parallel cables and detecting any imbalance has been described which is very simple, reliable and economical to manufacture. A novel circuit means having a long buildup time-constant and a short decay time-constant has been described which is reliable and positive-acting, yet is very sensitive and will not be activated by false signals. The system may be used when the airplane is being controlled manually or by autopilot.

Having thus described a preferred embodiment of the present invention in detail, it is to be understood that various changes, substitutions and alterations can be made in the component parts and in the combination thereof without departing from the spirit and scope of the invention as defined by the appended claims.

What is claimed is:

1. A sensing device for comparing and detecting an imbalance between first and second forces on a pair of generally parallel cables comprising:
   a first switch means and a second switch means,
   a member pivotally supported for pivotal movement about an axis parallel to said cables for closing said first switch means and opening said second switch means when pivoted in a first direction about the axis, and for closing said second switch means and opening said first switch means when pivoted in the second direction about the axis,
   means engaging one of said cables adjacent to the pivot point for pivotally moving the member in a first direction about the axis with a force proportional to the first force in one of said cables, and
   means engaging the second of said cables adjacent to said pivot point for pivotally moving the member in a second direction about the axis with a force proportional to the second force in the second of said cables,
   whereby the member will be pivoted by an imbalance between the forces and close the switch means corresponding to the greater tension in said cables.

2. A sensing device for comparing and detecting an imbalance between the tensions in generally parallel first and second cables comprising:
   A first switch means and a second switch means,
   a member pivotally supported for pivotal movement about an axis parallel to said cables for closing the first switch means and opening the second switch means when pivoted in a first direction about the axis, and for closing the second switch means and opening the first switch means when pivoted in the second direction about the axis,
   first means connected to the member for engaging and deflecting the first cable such that tension in the first cable will tend to pivot the member in the first direction, and
   second means connected to the member for engaging and deflecting the second cable such that tension in the second cable will tend to pivot the member in the second direction,
   whereby the member will be pivoted by an imbalance in the tension of the cables in such a manner as to close the switch means corresponding to the cable having the greatest tension.

3. A sensing device for comparing and detecting an imbalance between the tensions in generally parallel first and second cables comprising:
   (a) a support and a first switch means and a second switch means,
   (b) a member pivotally connected to said support for pivotal movement about an axis for closing the first switch means and opening the second switch means when pivoted in a first direction about the axis, and for closing the second switch means and opening the first switch means when pivoted in the second direction about the axis,
   (c) first pulley means journaled on the member for engaging and deflecting the first cable such that tension in the first cable will tend to pivot the memmer in the first direction, and
   (d) second pulley means journaled on the member for engaging and deflecting the second cable such that tension in the second cable will tend to pivot the member in the second direction,
   (e) third pulley means journaled on said support spaced from the first means for deflecting the first cable in a direction opposite to the direction in which the first means deflects the cable, and
   (f) fourth pulley means journaled on said support spaced from the second means for deflecting the second cable in a direction opposite to the direction in which the second means deflects the cable, whereby the member will be pivoted by an imbalance in the tension of the cables in such a manner as to close the switch means corresponding to the cable and having the greatest tension, and the force exerted on the first and second means by tension in the respective cables will be amplified and the sensitivity of the system increased.

4. A sensing device for comparing and detecting an imbalance between the tensions in generally parallel first and second cables comprising:

a support means disposed adjacent the first and second cables, a member pivotally connected to the support member for pivotation about an axis disposed in a plane passing between the cables, first and second pulleys journaled on the member for engaging and deflecting the first and second cables respectively, the pulleys being disposed on opposite sides of the axis at substantially equal distances from the axis such that the tension in the first cable will tend to pivot the member in the first direction about the axis and the tension in the second cable will tend to pivot the member in a second direction about the axis, switch blade means connected to the member, and first and second electric contact means disposed on opposite sides of the switch blade means such that pivotal movement of the member in the first direction will cause the switch blade means to engage the first contact means and pivotal movement of the member in the second direction will cause the switch blade means to engage the second contact means.

5. A sensing device as defined in claim 4 further characterized by:

third and fourth pulley means journaled on the support means for engaging and deflecting the first and second cable means, respectively, in directions opposite to the directions in which the respective cables are deflected by the first and second pulley means, whereby the respective forces applied to the first and second pulley means by the cables will be amplified to increase the sensitivity of the device.

References Cited

UNITED STATES PATENTS 2,654,335  10/1953  Ball _____ 200—161 X
2,814,678  11/1957  McFarland _____ 200—153 X ROBERT K. SCHAEFER, *Primary Examiner.*

H. HOHAUSER, *Assistant Examiner.*

UNITED STATES PATENT OFFICE

CERTIFICATE OF CORRECTION

Patent No. 3,328,548                 June 27, 1967

James R. Younkin et al.

It is hereby certified that error appears in the above numbered patent requiring correction and that the said Letters Patent should read as corrected below.

Column 3, lines 3 and 66, for "wtih", each occurrence, read -- with --; lines 67 and 68, strike out "The autopilot 26 is coupled to the control system altitude."; column 4, line 18, for "undesride" read -- underside --; column 8, lines 64 and 65, for "memmer" read -- member --.

Signed and sealed this 16th day of July 1968.

(SEAL)
Attest:

Edward M. Fletcher, Jr.                 EDWARD J. BRENNER

Attesting Officer                     Commissioner of Patents